Figure 1:
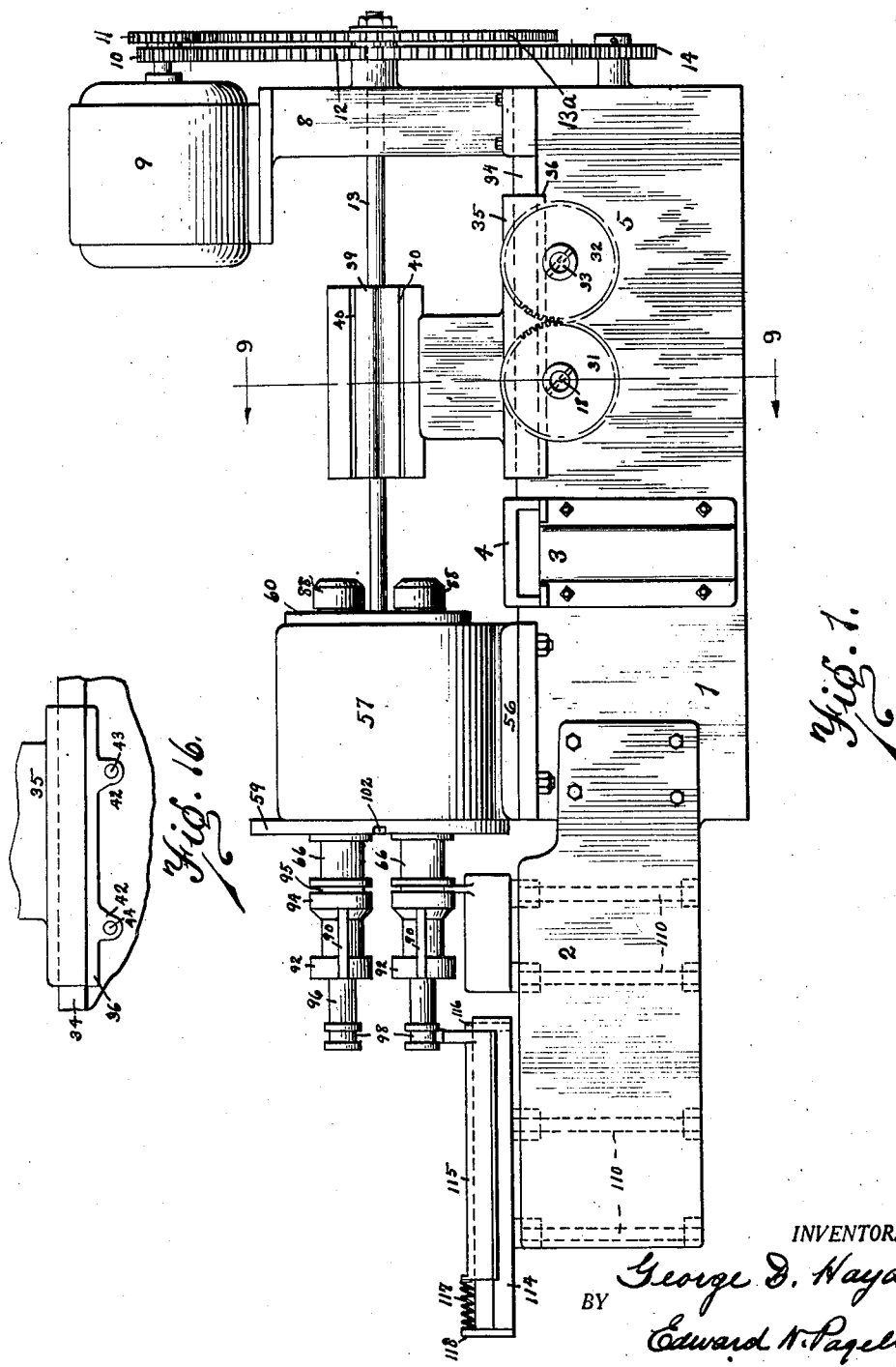

July 6, 1926.

G. D. HAYDEN 1,591,818

SCREW MACHINE

Original Filed Oct. 5, 1921   5 Sheets-Sheet 2

INVENTOR.
George D. Hayden
BY
Edward N. Pagelsen
ATTORNEY.

July 6, 1926.

G. D. HAYDEN

SCREW MACHINE

Original Filed Oct. 5, 1921   5 Sheets-Sheet 3

1,591,818

INVENTOR.
George D. Hayden
BY
Edward N. Pagelsen,
ATTORNEY.

July 6, 1926. 1,591,818
G. D. HAYDEN
SCREW MACHINE
Original Filed Oct. 5, 1921  5 Sheets-Sheet 4

INVENTOR.
George D. Hayden
BY
Edward N. Pagilsen,
ATTORNEY.

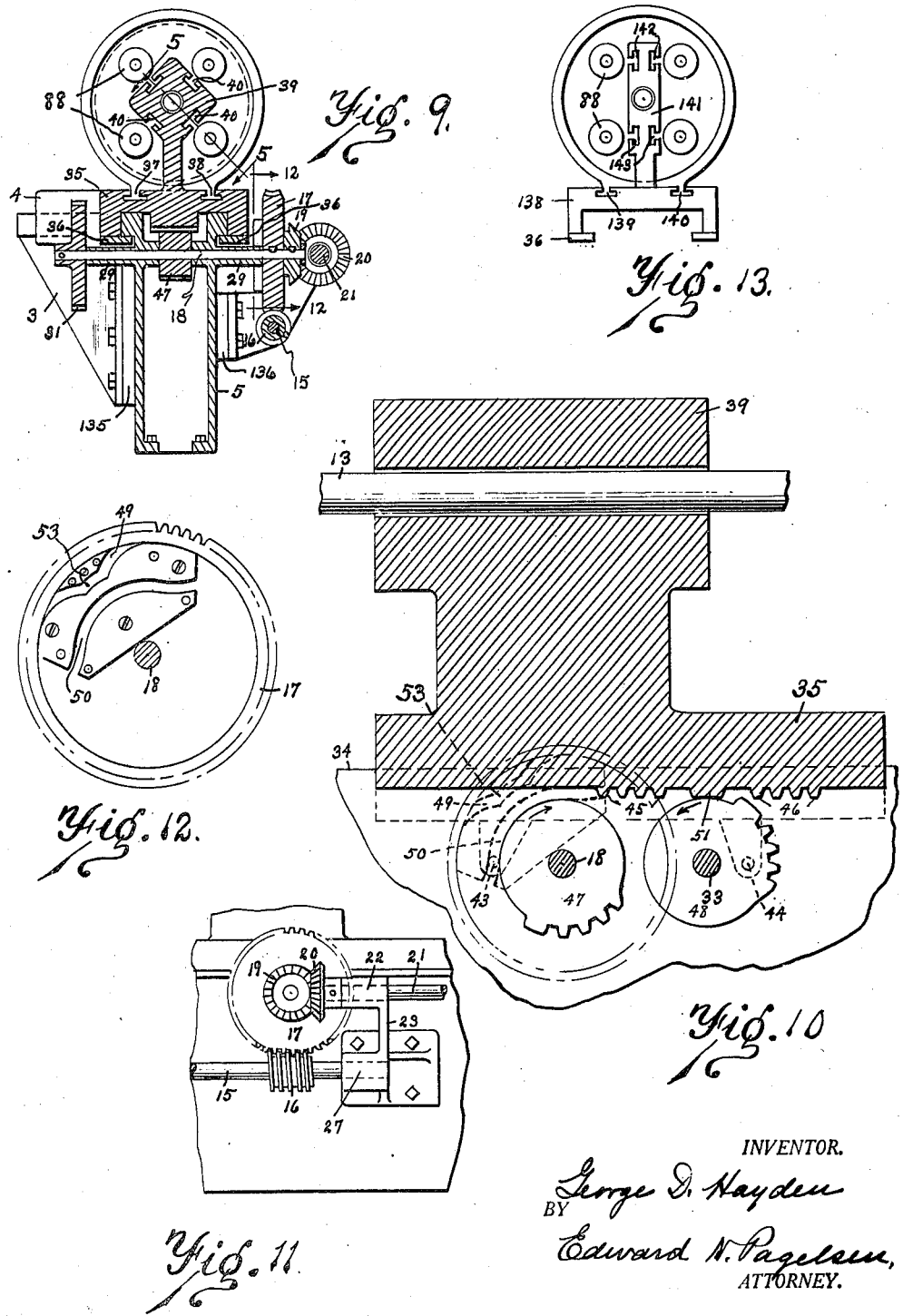

Patented July 6, 1926.

1,591,818

UNITED STATES PATENT OFFICE.

GEORGE D. HAYDEN, OF DETROIT, MICHIGAN, ASSIGNOR TO DETROIT AUTOMATIC MACHINE COMPANY, OF DETROIT, MICHIGAN, A CORPORATION OF MICHIGAN.

SCREW MACHINE.

Substitute for application Serial No. 505,462, filed October 5, 1921. This application filed March 26, 1926, and in Canada September 18, 1925. Serial No. 97,807.

This invention relates to devices for machining bars of metal to produce screws, pins and other small objects, and to that particular type which embodies a number of work carrying spindles rotatably mounted in a rotatable head and a reciprocating tool carriage provided with tool holding mechanisms; and its object is to provide a novel, simple and effective work carrying head embodying means for feeding the work forward at regular intervals, and for rotating the work carrying spindles relative to the head in which they are mounted, and to provide a tool carrier movable toward and from the work carrier, and novel means for moving the tool carrier from and toward the work carrying spindles at relatively high and constant speeds until near its rearward position, at which point it is gradually reduced in speed until the slide has been brought to a state of rest, during which, movements of other parts of the machine take place, such as feeding the stock and indexing the spindle carrying head, the slide then slowly starting from the rest in its forward movement and increasing to the maximum speed until it reaches the point where the work cutting tools take effect, at which point the tool carrying slide is checked and then stopped for a predetermined period, after which it slowly begins its return movement, increasing its speed until maximum is reached. These reciprocations of the carrier may be predetermined and governed by any well known speed changing mechanism, which are omitted because in general use.

A further object of this invention is to provide means for holding the tool carrier at the end of its movements toward the work carrying spindles for an appreciable period of time in order that all inaccuracies due to the spring or flexure of the parts of the machine may be eliminated and to hold it at the other end of its movements in order to give time for the bars to be fed forward and the head to rotate to carry the work from one tool to the next.

Another object of this invention is to provide a radial ball bearing and a plain bearing for the work carrying spindles, and to provide a cavity or receptacle for lubricating oil in the spindle carrying head, so that the heavy duty work carrying spindles will be properly lubricated at all times.

Another object of this invention is to provide means for obviating the frequent breakages of the work feeding devices by introducing yielding members in the mechanism actuating the same.

Another object of this invention is to provide a bed for a multiple spindle screw machine which can be machined to receive the several parts, such as the head and carriages, at minimum expense.

Figure 2:
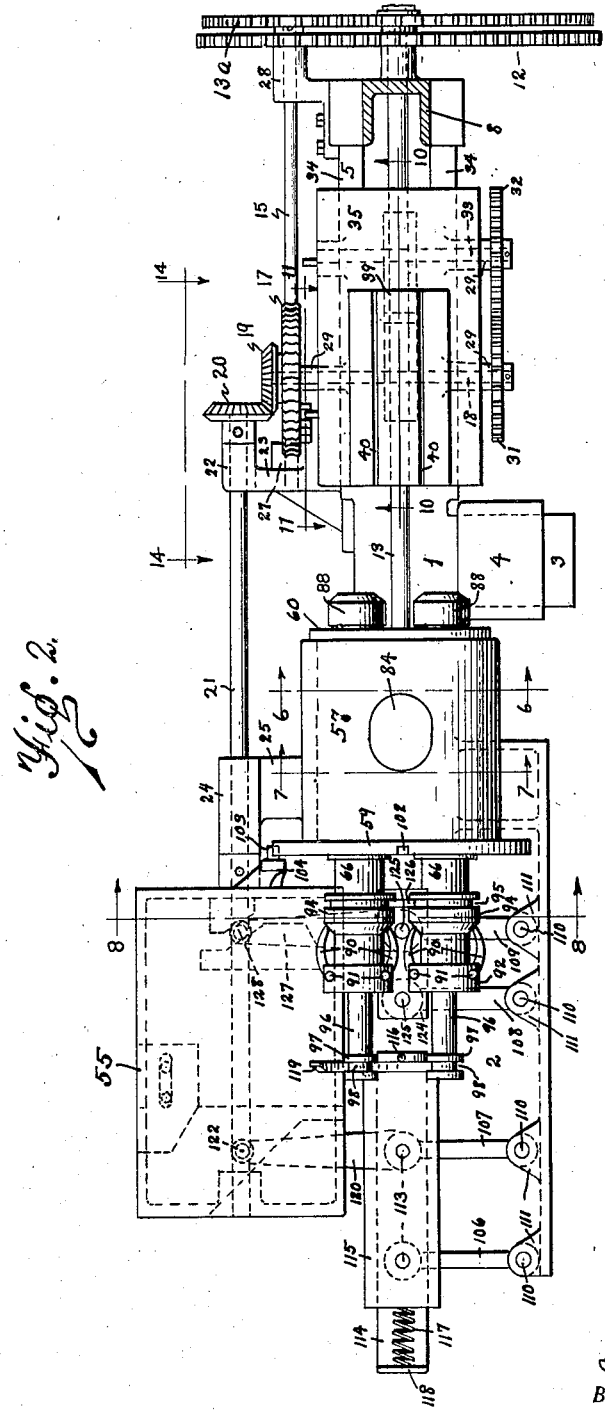
Figure 3:
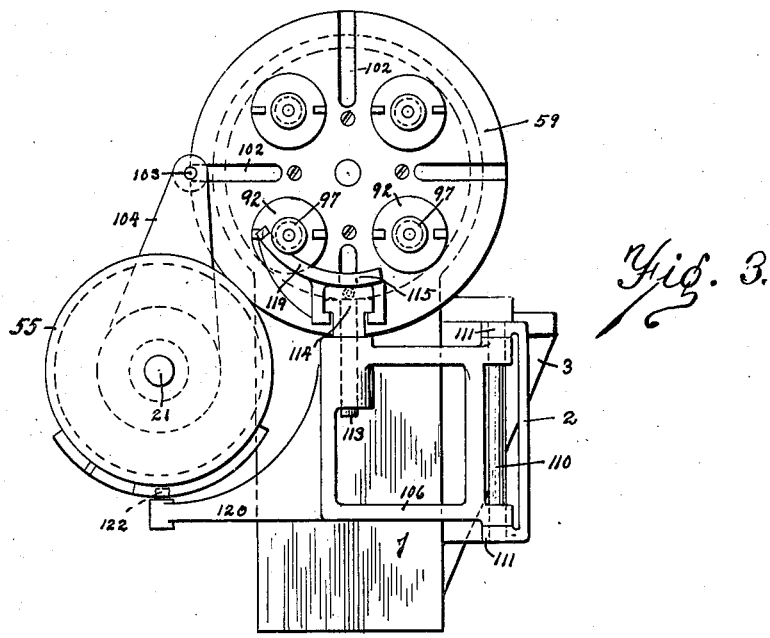
Figure 4:
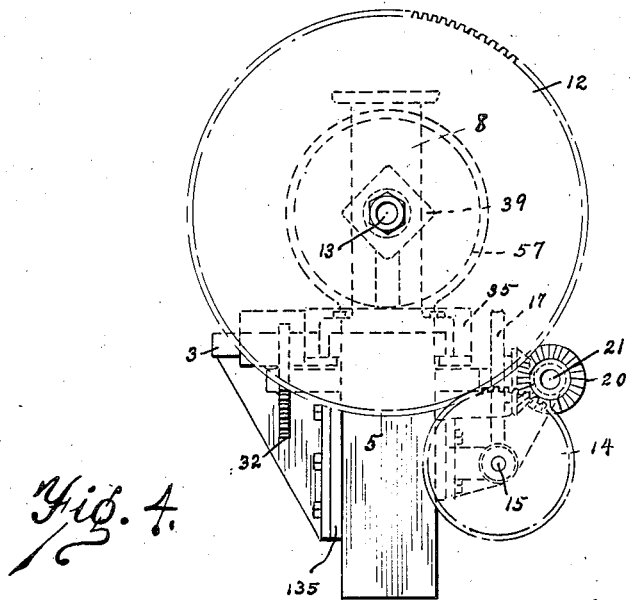
Figure 6:
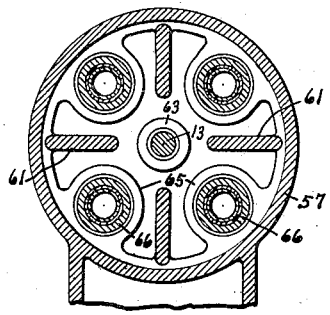
Figure 7:
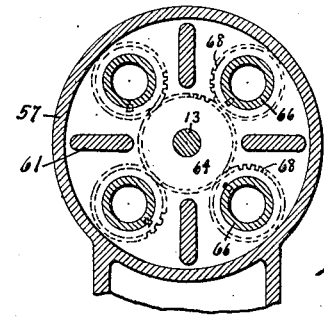
Figure 5:
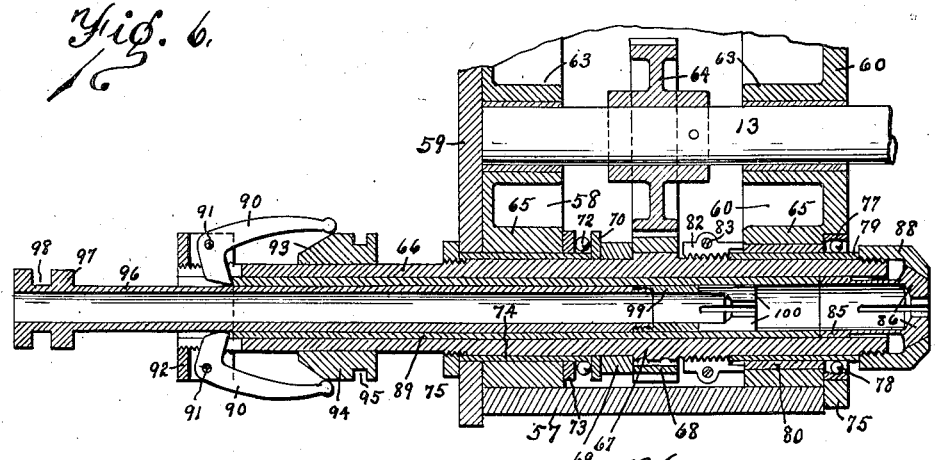
Figure 8:
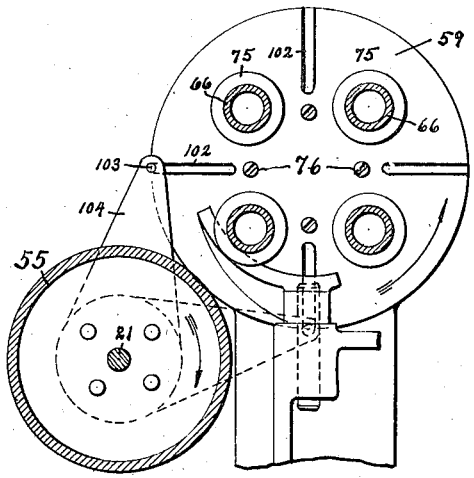

In the accompanying drawings, Fig. 1 is a front elevation of this improved screw machine. Fig. 2 is a plan thereof. Figs. 3 and 4 are elevations of the left and right ends of the machine respectively. Fig. 5 is a longitudinal section of one of the work holders on a line 5—5 of Fig. 9 on a larger scale. Figs. 6, 7 and 8 are sections on the lines 6—6, 7—7 and 8—8 of Fig. 2, respectively. Fig. 9 is a section on the line 9—9 of Fig. 1. Figs. 10 and 11 are sections on the lines 10—10 and 11—11 of Fig. 2, the former being on a larger scale. Fig. 12 is an elevation of the cam for actuating the tool carrier as seen from the line 12—12 of Fig. 9. Fig. 13 is a rear elevation of a modified form of tool carrier. Fig. 14 is a development of the cam for feeding the work and operating the work holding collet. Fig. 15 is an end view of a collet. Fig. 16 is a side elevation of the carriage for the tool holder.

Similar reference characters refer to like parts throughout the several views.

This machine is formed with a bed 1 having an extension 2 on which the work feeding mechanism is mounted, a bracket 3 on which a cross carriage 4 of any desired construction is slidable, and a portion 5 for the tool carriage. It will be noticed that with the exception of two shafts which are journaled in the base, all the different parts of the machine are mounted on flat outer surfaces of the bed. This arrangement insures perfect alinement of the work carrying head, the tool carriage and of the shafts and renders all parts perfectly accessible.

Mounted on the rear end of the bed is a bracket 8 on which is mounted a motor 9 having a pinion 10 meshing with the idler gear 12 loose on the main shaft 13 which is carried at one end by this pedestal, this gear meshing with the pinion 14 on the shaft 15. A second pinion 11 on the motor shaft meshes with the gear 13ᵃ secured to the shaft 13. Any other desired means may be employed to actuate the shafts 13 and 15. As shown in Figs. 9 and 11, this shaft 15 carries a worm 16 which meshes with the worm wheel 17 on the transverse shaft 18, journaled in the part 5 of the bed 1, and on the outer end of this shaft is a miter gear 19 meshing with a similar gear 20 on the shaft 21. This shaft 21 is journaled in bearings 22 and 24 carried by the brackets 23 and 25 and controls the feeding of the work and the indexing of the work carrying head. The shafts 18 and 21 rotate once for each cycle of the machine during which the work is fed forward one step, the work carrying head is rotated the angular distance between work carrying spindles, the spindles are given the necessary rotations so that at each tool the desired result may be obtained, and the tool carriage is moved to carry the several tools thereon up to the work, kept there until each tool has completed its work and then moved back. The several details are as follows.

The shaft 15 is preferably mounted in two bearings 27 and 28 and the transverse shaft 18 in hubs 29 on the bed 1. This shaft carries a gear 31 which meshes with a similar gear 32 on a shaft 33 so that these two shafts rotate in opposite directions. The bed is formed with guides 34 for the tool carriage 35 which has the usual gibs 36 to hold it in position. The carriage may be of the construction shown in Fig. 9 or in Fig. 13. In Fig. 9, the carriage has T-slots 37 and 38 so that tools of any desired character may be attached to it, and a polygonal head 39 having T-slots 40 in its several faces, the number of the faces on the head 39 equaling the number of the spindles to be described later on. It may be said that these T-slots 40 are in evenly spaced radial planes passing through the central line of the main shaft 13 and the several faces of the head 39 are at right angles to these planes, the slots extending parallel to this shaft. This permits accurate adjustment of the tools to the work in the spindles.

Extending down from the rear guide 36, shown in Fig. 16, are two brackets 42 which carry pins 43 and 44 which are preferably in the plane of the shafts 18, 21 and 33. On the lower side of the tool carriage 35 are the rack-teeth 45 and 46 fully shown in Fig. 10. On the shafts 18 and 33 are the mutilated gears 47 and 48, each of which is adapted to engage the rack bar for a period of about ninety degrees. On the worm wheel 17 are cams forming two cam grooves 49 and 50. The former is shown to be about forty-five degrees of length and the latter about one hundred thirty-five degrees of length, but these dimensions may be varied as desired.

The gears 47 and 48 rotate in opposite directions as indicated by the arrows thereon, and it will be noted that each gear has a heavy front tooth adapted to engage the heavy middle tooth 51 on the carriage. The gear 48 is about to engage the rack just as the pin 43 is leaving the cam groove 50, which is just starting the carriage moving to the left in Fig. 10. The starting movement imparted by the cam is gradual but the movement imparted by the gear 48 is constant.

When the gear 48 disengages the rack bar, the pin 44 will have entered the cam groove 49 whose front end has just reached the horizontal line of the shafts 18 and 33. The first portion of this cam continues the forward movement of the carriage, but when the pin 44 reaches the circular portion 53 of this cam, the carriage is held at rest in its forward position. This gives the tools on the head 39 sufficient time to finish the work, doing away with inaccuracies due to the spring of the parts of the machine and of the work. Continued movement of this cam starts the carriage back and the pin 44 leaves the cam groove 49 just as the first tooth of the gear 47 engages the middle tooth 51 of the rack. The gear 47 now moves the carriage back at constant speed and when its teeth disengage the rack teeth 45 the pin 43 just enters the longer cam groove 50.

During the first fifteen degrees or so the cam continues the rearward movement of the carriage but at decreasing speed until the carriage is finally brought to rest. Then during somewhat more than one hundred degrees, the carriage remains at rest, during which the work and the work carrier are positioned for the next operations of the tools. Finally the pin 43 reaches the end of the rest portion of this cam, as indicated in Fig. 10, and the forward movement of the carriage begins. This driving mechanism is unusually compact and the gears are entirely enclosed.

*The work carrier.*

As stated before, a main shaft 13 extends forward into the work supporting head and the rotation of the shaft depends upon the number of turns the work is to make when in contact with the several tools, and the rate of rotation is governed by the relative sizes of the gears 11 and 13ᵃ. The gears 10 and 14 may also be changed to control the rate of rotation of the shaft 15, worm 16, worm wheel 17 and therefore control the feed of the tool carriage. The shaft 21, however, has one complete rotation for each forward and back movement of the tool carriage, and on its left end (Fig. 2) is mounted a drum 55 which controls the several operations of the head.

A foot 56 secured to the bed carries a cylindrical housing 57 in which the head is rotatable. The head is formed with an outer spider 58 and a plate 59 in engagement therewith, and an inner spider 60 connected to the outer spider 58 by the integral bars 61. See Figs. 6 and 7. The spiders have hubs 63 for the main shaft 13 and on this shaft is secured a gear 64 as shown in Fig. 5. These spiders also have hubs 65 in which the work holding spindles are mounted.

Each work holding spindle is formed of three main parts; the work feeder, the collet and its operating mechanism, and the supporting sleeve and its bearings. The supporting sleeve 66 has a central enlarged portion 67 on which the pinion 68 is mounted. Next adjacent thereto is a collar 69 which supports the bearing ring 70 for the thrust balls 72 which bear against the second ring 73 positioned against a hub 65. A bearing sleeve 74 is preferably employed and these several parts 69, 70, 72, 73 and 74 are held from moving longitudinally from the central portion 67 by a nut 75 on the sleeve 66.

The spider 60 has a flange 75' extending over the edge of the body or housing 57 and together with the indexing plate 59 attached to the spider 63 by the bolts 76, prevent endwise movement of the work carrier. A bearing ring 77 is mounted on the spider 60 for each work carrying spindle, and bearing balls 78 are mounted therein on the bearing sleeve 79 on the spindle. The spider is provided with a bearing sleeve 80. It has been found that the combination of the plain bearings composed of sleeves 79 and 80 together with a ball bearing is more effective than either alone.

Movement to the right is prevented by the two-part nut 82 which may be clamped on the sleeve 66 by means of bolts 83, then adjusted to engage the hub 65 and sleeve 80 and then locked by these bolts. This two-part nut may be adjusted before the work carried is positioned in the housing, but after that may be adjusted in place by means of a tool introduced through an opening in the top of the housing, normally closed by the plate 84. Movement to the left in Fig. 5 is prevented by the balls 72, collars 70 and 73, collar 69 and the enlarged portion 67 of the sleeve 66. All these parts rotate in an oil container which consists of the housing 57, the spider 60 and its flange 75 and the index plate 59.

The collet is of usual form having a cylindrical body 85 and jaws 86, each of which is preferably formed with a central rib 87, as shown in Fig. 15, to engage the spindle cap 88 which is screwed onto the end of the sleeve 66. The jaws are forced together to engage the work by means of the tube 89 which may be moved inwardly by the small levers 90 mounted on pins 91 carried by the collar 92 screwed onto the outer end of the sleeve 66. These levers are operated by the inclined face 93 of the collar 94 having a groove 95.

The work feeder consists of a tube 96 having a collar 97 at its outer end provided with a groove 98. The inner end of this tube connects to the sleeve 99 from which the resilient jaws 100 extend. These jaws are sufficiently stiff to feed the work but not enough to move the work when held by the collet.

The plate 59 is formed with four radial grooves 102, one for each spindle, which grooves are adapted to receive the pin 103 carried by the arm 104 on the inner end of the cam drum 55. At each rotation of the cam drum the work carrier is therefore turned ninety degrees and this occurs just after the tool carriage has completed its rearward or return movement.

As shown in Figs. 2 and 3, four swinging frames 106, 107, 108 and 109 are mounted on pins 110 supported by lugs 111 on the part 2 of the bed. The frames 106 and 107 carry pins 113 at their free ends and on these pins is mounted a guide bar 114 on which a carriage 115 is slidable. A pin 116 on the guide bar causes the carriage to move outwardly with the guide bar and a spring 117 between the outer end of the carriage and a flange 118 on the guide bar normally causes the two to move inwardly together.

On the carriage 115 is mounted a curved control bar 119 adapted to be received in the grooves 98 on the collars 97 at the outer ends of the work feeding tubes. As the work carrier is rotated by the arm 104 and pin 103, the collars 97 slide over this curved bar 119 as shown in Fig. 3. Extending from the frame 107 is an arm 120 which carries a pin 122 adapted to engage the cams 123 and 121 on the cam drum 55 and be moved forward and backward thereby, the arm swinging the frame and the moving frame the guide bar 114, and the guide bar the carriage 115 and curved control bar 119. The guide bar 114 is always parallel to the main shaft 13 and therefore the curved bar 119 is always parallel to the grooves 98. The curved bar 119 and the work feeding tubes 96 are always moved out positively by means of the pin.

A carriage 124 is mounted on the pins 125 carried by the frames 108 and 109 and this carriage supports a curved control bar 126 adapted to enter the grooves 95 in the collars 94 which control the collet. An arm 127 similar to the arm 120 carries a pin 128 which is adapted to engage the cams 129 and 130 on the drum 55. The timing of these cams is shown diagrammatically in Fig. 14.

The pin 128 which moves the collars 94 is first engaged by the cam 129 and moved to the right in Fig. 2, causing the collet to release the work. Immediately thereafter the cam 123 moves the pin 122 and the collar 97 and the work feeding tube to the right to feed the work forward. Should the work be jammed in the spindle, the only result will be a compression of the spring 117. The cam 130 now engages the pin 128 to cause the collar 94 to move outward or to the left, separating the levers 90 and causing the collet to grip the work. The cam 121 then moves the feeding tube 96 back to normal position. This cam is made adjustable so as to determine the distance the work is fed forward. The normal position of the feed tubes is immaterial and they may be left at the inner or the outer ends of their movements as may be desired.

By forming the top of the bed flat and by having the bosses 135 and 136 on the sides of the base to which the various brackets are attached in the same planes, it becomes possible to place a number of these bases on a planer and to finish them accurately at a single setting of the tool for each side and for the top.

Instead of the head 39 on the carriage 35, the construction shown in Fig. 13 may be employed. This carriage 138 has the grooves 139 and 140 and the head 141 provided with grooves 142 and 143 to receive bolts for attaching tools thereto. The vertical spacing of the grooves 142 and 143 is preferably the same as the distance between adjacent work carrying spindles.

By substituting pinions and gears of other sizes for the pinions 10 and 11 and gears 12 and 13ª, the relative speeds of the shafts 13 and 15 and the parts connected thereto may be varied as desired.

The other details and proportions of the various parts of this machine may be changed by those skilled in the art without departing from the spirit of my invention as set forth in the following claims.

I claim:—

1. In a multiple spindle screw machine, the combination of a base, an intermittently rotating head mounted on the base, a series of work carrying spindles mounted in said head, means to rotate the spindles, a tool carrier slidable on the base toward and from the spindles, a rack attached to said carriage, a continuously rotating shaft below the tool carriage, a mutilated gear mounted on the shaft and engaging the rack to move the carriage in one direction for a portion of its stroke, a cam mounted on said shaft to complete the stroke of the carriage and begin the return stroke thereof, and means to complete the return stroke of the carriage.

2. In a multiple spindle screw machine, the combination of a base, an intermittently rotating head mounted on the base, a series of work carrying spindles mounted in said head, means to rotate the spindles, a tool carrier slidable on the base toward and from the spindles, a rack attached to said carriage, a continuously rotating shaft below the tool carriage, a mutilated gear mounted on the shaft and engaging the rack to move the carriage in one direction for a portion of its stroke, a cam mounted on said shaft to complete the stroke of the carriage and begin the return stroke thereof, and means to complete the return stroke of the carriage embodying a second mutilated gear adapted to engage the rack bar and rotating in the opposition direction from the first, and a cam to complete the return stroke of the carriage and begin the forward stroke thereof.

3. In a multiple spindle screw machine, the combination of a base, an intermittently rotating head mounted on the base, a series of work carrying spindles mounted in said head, means to rotate the spindles, a tool carrier slidable on the base toward and from the spindles, a rack attached to said carriage, a continuously rotating shaft below the tool carriage, a mutilated gear mounted on the shaft and engaging the rack to move the carriage in one direction for a portion of its stroke, a cam mounted on said shaft to complete the stroke of the carriage and begin the return stroke thereof, and means to complete the return stroke of the carriage, said cam having a dwell to hold the tool carriage at the end of its forward stroke during a plurality of rotations of the spindles.

4. In a multiple spindle screw machine, the combination of a base, a head thereon, work carrying spindles rotatably mounted in the head, a tool carriage, a mutilated gear to move the tool carriage toward the spindle, and a rotating cam to force the tool carriage to complete its movement toward the spindles and to begin its return movement, said cam having a circular rest portion to hold the tool carriage at the forward end of its movement during a plurality of rotations of the spindles.

5. In a multiple spindle screw machine, the combination of a base, a head thereon, work carrying spindles rotatable in the head, a tool carriage slidable on the base and a rack bar attached thereto, a pair of shafts mounted in the base, means to rotate the shafts in opposite directions, a mutilated gear mounted on each shaft and adapted to alternately engage said rack bar to move the carriage in opposite directions, and a cam mechanism actuating said carriage between engagements of the gears to reverse the movements of the carriage.

6. In a multiple spindle screw machine, the combination of a base, a head thereon, work carrying spindles rotatable in the head, a tool carriage slidable on the base and a rack bar attached thereto, a pair of shafts mounted in the base, means to rotate the shafts in opposite directions, a mutilated gear mounted on each shaft and adapted to alternately engage said rack bar to move the carriage in opposite directions, and a cam mechanism actuating said carriage between engagements of the gears to reverse the movements of the carriage, one of said cam mechanisms being formed with a rest to hold the carriage at the end of its forward movement during a plurality of rotations of the spindles.

7. In a screw machine, a base and a work carrier mounted thereon and adapted to hold a plurality of pieces of work, and a tool carrier slidably mounted on the base and having parallel upright faces to which the tools may be secured, each face having a plurality of T-slots to permit a plurality of tools to be attached to it.

8. In a multiple spindle screw machine, the combination of a base, an intermittently rotating head mounted on the base, a series of work carrying spindles mounted in said head, means to rotate the spindles, a tool carrier slidable on the base toward and from the spindles, a rack attached to said carriage, a continuously rotating shaft, a mutilated gear on the shaft and engaging the rack to move the carriage in one direction for a portion of its stroke, and means to cause the carriage to complete said stroke and make its return stroke.

9. In a screw machine, the combination of a base, a work carrying spindle mounted on the base, means to rotate the spindle, a tool carrier slidable on the base toward and from the spindle, a rack attached to said carriage, a continuously rotating shaft, a mutilated gear mounted on the shaft and engaging the rack to move the carriage in one direction for a portion of its stroke, a cam mounted on said shaft to complete the stroke of the carriage and begin the return stroke thereof, and means to complete the return stroke of the carriage.

10. In a screw machine, the combination of a base, a work carrying spindle mounted on the base, a tool carrier slidable on the base toward and from the spindle, a rack attached to said carriage, a continuously rotating shaft, a mutilated gear mounted on the shaft and engaging the rack to move the carriage in one direction for a portion of its stroke, and means to cause the carriage to complete said stroke and make its return stroke.

11. In a multiple spindle screw machine, the combination of a base, a housing mounted thereon, a head rotatably mounted in the housing and formed with bearing sleeves, work carrying spindles mounted in said sleeves, and radial ball bearings mounted in the work carrying head near the chuck end of the spindles to receive the radial thrust thereof.

12. In a multiple spindle screw machine, the combination of a base, a housing mounted thereon consisting of a cylindrical member and a foot, a work carrying head mounted in said housing and consisting of a spider at each end of the housing, means on said head extending over the ends of said housing to prevent the escape of lubricant, said spiders having bearings, and work carrying spindles rotatably mounted in said bearings, said housing having an opening to permit the introduction of lubricant.

13. In a multiple spindle screw machine, the combination of a base and housing thereon, said housing having a cylindrical bore, a work carrying head rotatably mounted in said housing and comprising a spider at each end of the housing, a series of sleeves rotatable in said spiders, a work engaging collet at one end of each sleeve, means mounted on said sleeve to control the operation of the collet, a work feeding tube mounted within the work carrying spindle and having jaws at its inner end to engage the work and a collar at its outer end, a guide parallel to said spindle, a carriage slidable on said guide and adapted to engage the collars on the work feeding tubes successively, a spring between said guide and said carriage whereby movement of the guide may be transmitted to said carriage, and means to move said guide longitudinally to actuate the carriage and the work feeding tube.

14. In a multiple spindle screw machine, the combination of a base and a housing mounted thereon, a work carrier rotatable in said housing and a series of work carrying spindles mounted in said carrier, a collet at one end of each spindle to engage the work, means mounted at the opposite end of said spindle to actuate the collet and embodying a circular wedge having a circumferential groove, a frame extending from said base and a pair of levers pivotally mounted on said frame, a block mounted on the ends of the levers and held parallel to said spindles by said levers, a guide bar mounted on said block and adapted to engage in the grooves in said circular wedges, and means to swing said levers to move said block control said collet.

15. In a multiple spindle screw machine, the combination of a base and a housing mounted thereon, a work carrying head rotated in said housing, a series of work carrying spindles mounted in said head and each embodying a longitudinally slidable work feeding tube, each of said tubes having a collar at one end provided with a circumferential groove, a frame mounted on said base, a pair of levers mounted on said frame, a guide mounted on the ends of said levers and adapted to swing toward and from said housing and being held constantly parallel to the axis of said head, a carriage slidable on said guide, a curved bar mounted on said carriage and adapted to engage in the grooves in said collars, and resilient means between said guide and said carriage whereby the movement of said guide may be transmitted to said carriage to actuate the work feeding tube.

16. In a multiple spindle screw machine, the combination of a base and a housing mounted thereon, a work carrying head rotated in said housing, a series of work carrying spindles mounted in said head and each embodying a longitudinally slidable work feeding tube, each of said tubes having a collar at one end provided with a circumferential groove, a frame mounted on said base, a pair of levers mounted on said frame, a guide mounted on the ends of said levers and adapted to swing toward and from said housing and being held constantly parallel to the axis of said head, a carriage slidable on said guide, a curved bar mounted on said carriage and adapted to engage in the grooves in said collars, resilient means between said guide and said carriage whereby the movement of said guide may be transmitted to said carriage to actuate the work feeding tube, and a pin mounted on said guide to positively engage said carriage to cause the same to withdraw said work feeding tube.

17. In a multiple spindle screw machine, rotatable means for holding a plurality of pieces of work, and a tool slide comprising a base and a portion extending from the base and having substantially parallel upright sides each side having T-slots for securing tools to said upright portion.

18. In a multiple spindle screw machine, rotatable means revoluble about a common axis for holding a plurality of pieces of work, and a tool slide comprising a base, said slide also comprising a portion extending up from the base and having substantially vertical sides parallel to the axis of the work holder, said upright portion having provisions for securing tools on each of its sides.

19. In a multiple spindle screw machine, rotatable means revoluble about a common axis for holding a plurality of pieces of work, and a tool slide comprising a base, said slide also comprising a portion extending up from the base and having substantially vertical sides parallel to the axis of the work holder, said upright portion having provisions for securing tools on each of its sides, said upright portion extending up above the circle described by said rotatable work holders.

20. In a multiple spindle screw machine, the combination of a base, a cylindrical housing mounted thereon, a work carrying head mounted in the housing and consisting of a spider at each end of the housing, work carrying spindles rotatably mounted in the housing, each spindle having an enlargement intermediate its ends, a thrust bearing between said enlargement of each spindle and one of the spiders, and an adjusting device mounted on said spindle and engaging the other spider.

21. In a multiple spindle screw machine, the combination of a base, a cylindrical housing mounted thereon, a work carrying head mounted in the housing and consisting of a spider at each end of the housing, work carrying spindles rotatably mounted in the housing, each spindle having an enlargement intermediate its ends, a thrust bearing between said enlargement of each spindle and one of the spiders, and an adjusting device mounted on said spindle and engaging the other spider, said adjusting device consisting of a split nut threaded on the spindle and means to clamp the nut against rotation.

22. In a screw machine, a base and a work carrier thereon adapted to hold a plurality of pieces of work, a tool carrier slidably mounted on the base, a rack attached to said carrier, a continuously rotating shaft, and a mutilated gear mounted on the shaft and engaging the rack to move the carrier in one direction for a portion of its stroke.

GEORGE D. HAYDEN.